(12) United States Patent
Nagaraj

(10) Patent No.: US 7,305,519 B1
(45) Date of Patent: Dec. 4, 2007

(54) ERROR PROTECTION FOR ASSOCIATIVE MEMORY ENTRIES AND LOOKUP OPERATIONS PERFORMED THEREON

(75) Inventor: Ashwath Nagaraj, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 568 days.

(21) Appl. No.: 10/813,210

(22) Filed: Mar. 29, 2004

(51) Int. Cl.
G06F 12/16 (2006.01)

(52) U.S. Cl. .............................. 711/108; 365/49; 714/6; 714/763

(58) Field of Classification Search ...................... None
See application file for complete search history.

(56) References Cited

U.S. PATENT DOCUMENTS

| | | | |
|---|---|---|---|
| 3,648,254 A | 3/1972 | Beausoleil |
| 4,168,486 A | 9/1979 | Legory |
| 4,296,475 A | 10/1981 | Nederlof et al. |
| 4,692,922 A | 9/1987 | Kiriu et al. |
| 4,740,968 A | 4/1988 | Aichelmann, Jr. |
| 4,791,606 A | 12/1988 | Threewitt et al. |
| 4,852,100 A | 7/1989 | Christensen et al. |
| 4,996,666 A | 2/1991 | Duluk, Jr. |
| 5,313,475 A | 5/1994 | Cromer et al. |
| 5,379,304 A | 1/1995 | Dell et al. |
| 5,383,146 A | 1/1995 | Threewitt |
| 5,440,715 A | 8/1995 | Wyland |
| 5,450,351 A | 9/1995 | Heddes |
| 5,841,874 A | 11/1998 | Kempke et al. |
| 5,842,040 A | 11/1998 | Hughes et al. |
| 5,845,324 A | 12/1998 | White et al. |
| 5,978,885 A | 11/1999 | Clark, II |
| 6,041,389 A | 3/2000 | Rao |
| 6,047,369 A | 4/2000 | Colwell et al. |
| 6,069,573 A | 5/2000 | Clark, II et al. |
| 6,081,440 A | 6/2000 | Washburn et al. |
| 6,134,135 A | 10/2000 | Andersson |
| 6,137,707 A | 10/2000 | Srinivasan et al. |

(Continued)

OTHER PUBLICATIONS

U.S. Appl. No. 09/910,227, filed Jul. 20, 2001, Ross.

(Continued)

*Primary Examiner*—Gary Portka
(74) *Attorney, Agent, or Firm*—The Law Office of Kirk D. Williams

(57) ABSTRACT

Error protection is provided for associative memory entries and lookup operations performed thereon. Protected associative memory entries are determined which include one or more protection bits. These protected entries are programmed into an associative memory, typically with each protected entry being programmed into two or more consecutive locations. Corresponding protected lookup words are generated and used to perform lookup operations in the associative memory. For binary content-addressable memories (CAMs) and ternary content-addressable memory (TCAMs), one or more error detection bits are used per entry to prevent or at least reduce the possibility of a lookup error. For example, a single parity bit or multiple error-correction code (ECC) bits may be used per entry. The use of the protection bits reduces the possibility of a false matching of a corrupted entry, and the duplicate entries reduce the possibility of not matching an entry that should be matched as all copies of the entry must be corrupt in order to not match one of the entries during a lookup operation.

21 Claims, 11 Drawing Sheets

U.S. PATENT DOCUMENTS

| | | |
|---|---|---|
| 6,154,384 A | 11/2000 | Nataraj et al. |
| 6,175,513 B1 | 1/2001 | Khanna |
| 6,181,698 B1 | 1/2001 | Hariguchi |
| 6,199,140 B1 | 3/2001 | Srinivasan et al. |
| 6,240,003 B1 | 5/2001 | McElroy |
| 6,246,601 B1 | 6/2001 | Pereira |
| 6,307,855 B1 | 10/2001 | Hariguchi |
| 6,374,326 B1 | 4/2002 | Kansal et al. |
| 6,377,577 B1 | 4/2002 | Bechtolsheim et al. |
| 6,389,506 B1 | 5/2002 | Ross et al. |
| 6,510,509 B1 | 1/2003 | Chopra et al. |
| 6,526,474 B1 | 2/2003 | Ross |
| 6,535,951 B1 | 3/2003 | Ross |
| 6,606,681 B1 | 8/2003 | Uzun |
| 6,618,281 B1 | 9/2003 | Gordon |
| 6,715,029 B1 | 3/2004 | Trainin et al. |
| 6,717,946 B1 | 4/2004 | Hariguchi et al. |
| 6,728,124 B1 | 4/2004 | Ichiriu et al. |
| 6,732,227 B1 | 5/2004 | Baumann |
| 6,738,862 B1 | 5/2004 | Ross et al. |
| 6,879,504 B1 * | 4/2005 | Lien et al. ..................... 365/49 |
| 6,978,343 B1 * | 12/2005 | Ichiriu ....................... 711/108 |
| 7,152,140 B2 * | 12/2006 | Sit et al. ..................... 711/108 |
| 2004/0015752 A1 | 1/2004 | Patella et al. |
| 2004/0015753 A1 | 1/2004 | Patella et al. |
| 2004/0030802 A1 | 2/2004 | Eatherton et al. |
| 2004/0030803 A1 | 2/2004 | Eatherton et al. |

OTHER PUBLICATIONS

U.S. Appl. No. 11/040,678, filed Jan. 22, 2005, Trainin.
U.S. Appl. No. 10/879,254, filed Jun. 29, 2004, Shoham et al.
"Soft Error in TCAMs: Causes and Cures," Sibercore Technologies, Jul. 2003, Kanata, ON, Canada.
"Technical Description of Turbo Product Codes," Version 4.0, Jun. 1999, Efficient Channel Coding, Inc., Orange, Ohio, USA.

* cited by examiner

GENERATING PROTECTION ENTRIES

GENERATING PROTECTION ENTRIES

ASSOCIATIVE MEMORIES WITH
GENERATED PROTECTION ENTRIES

GENERATING A PROTECTED LOOKUP VALUE

**GENERATING A
PROTECTED LOOKUP VALUE

**GENERATING PROTECTION ENTRIES

GENERATING PROTECTION ENTRIES

GENERATING A
PROTECTED LOOKUP VALUE

GENERATING A PROTECTED LOOKUP VALUE

ERROR PROTECTION FOR ASSOCIATIVE MEMORY ENTRIES AND LOOKUP OPERATIONS PERFORMED THEREON

TECHNICAL FIELD

One embodiment of the invention relates to communications and computer systems, especially networked routers, packet switching systems, and other devices; and more particularly, one embodiment relates to error protection for associative memory entries and lookup operations performed thereon.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

Known approaches of packet classification include using custom application-specific integrated circuits (ASICs), custom circuitry, software or firmware controlled processors, and associative memories, including, but not limited to binary content-addressable memories (binary CAMs) and ternary content-addressable memories (ternary CAMs or TCAMs). Each entry of a binary CAM typically includes a value for matching against, while each TCAM entry typically includes a value and a mask. The associative memory compares a lookup word against all of the entries in parallel, and typically generates an indication of the highest priority entry that matches the lookup word. An entry matches the lookup word in a binary CAM if the lookup word and the entry value are identical, while an entry matches the lookup word in a TCAM if the lookup word and the entry value are identical in the bits that are not indicated by the mask as being irrelevant to the comparison operations.

Associative memories are very useful in performing packet classification operations. As with most any system, errors can occur. For example, array parity errors can occur in certain content-addressable memories as a result of failure-in-time errors which are typical of semiconductor devices.

A prior approach protects the associative memory entries with error detection or correction values when the associative memory is not being used to perform a lookup operation. For example, using a background operation, the associative memory entries are periodically checked and corrected for errors (e.g., read from their location and if an error, the correct value is written back). Another prior approach is to periodically over write each associative memory entry with the correct value. These and other prior approaches do not immediately detect the error, nor detect the error when a lookup operation is performed on the corrupted entry. Thus, there can be significant periods (e.g., several seconds to minutes which can be a very long time in the context of a packet switch) before such corrupted entry is corrected.

When a packet classification lookup operation is performed on an associative memory with corrupted entries, a bit error in an entry can result in a false hit, or a false miss. A false hit occurs when the corrupted value of an entry matches the lookup value when it otherwise would not match that entry (and thus another entry or no entry should have been match). A false miss occurs when an entry should have been matched except for the corruption in the entry. This could result in no entry being matched or another lower-priority entry being match. When these lookup operations are used for packet classification, an incorrect match or miss presents a problem especially when identifying a route or performing a security classification. Desired is a mechanism to reduce or eliminate the possible false hits or misses due to corrupted associative memory entries.

SUMMARY

Error protection is provided for associative memory entries and lookup operations performed thereon. Protected associative memory entries are determined which include one or more protection bits. These protected entries are programmed into an associative memory, typically with each protected entry being programmed into two or more consecutive locations. Corresponding protected lookup words are generated and used to perform lookup operations in the associative memory. For binary content-addressable memories (CAMs) and ternary content-addressable memory (TCAMs), one or more error detection bits are used per entry to prevent or at least reduce the possibility of a lookup error. For example, a single parity bit or multiple error-correction code (ECC) bits may be used per entry. The use of the protection bit or bits reduces the possibility of a false matching of a corrupted entry, and the duplicate entries reduce the possibility of not matching an entry that should be matched as all copies of the entry must be corrupt in order to not match one of the entries during a lookup operation.

One embodiment identifies multiple masks used for multiple associative memory entries. A protected entry for each entry in the multiple associative memory entries is determined. Each entry includes an original data portion and an original mask portion. Each determined protected entry includes a protected data portion and a protected mask portion. The protected data portion includes the original data portion and a protection bit located at a bit position corresponding to the original mask portion. The protected mask portion includes the original mask portion and a mask to enable the protection bit corresponding to the original mask portion and to mask protection bits corresponding to other masks of the multiple masks. The protection bit is determined by a parity or other error protection calculation on a result of the original data portion masked with the original mask portion.

In one embodiment, an associative memory is programmed with each of the protected entries. In one embodiment, each of the protective entries is programmed in two consecutive locations in the associative memory. In one embodiment, a lookup operation based on a protected lookup word is performed in the associative memory. In one embodiment, the protected lookup word includes a lookup word original data portion and a lookup word protected data portion. The lookup word protected data portion typically includes multiple bits, with each of the multiple bits being determined by a parity or other error protection calculation on a result of the lookup word original data portion masked with a different one of the multiple masks. In one embodiment, there are n multiple masks and the lookup word protected data portion has n bits.

One embodiment determines a protected entry for each original entry of multiple original associative memory entries, with the protected entry including the original entry and one or more protection bits. The one or more protection bits are determined by a parity or other error protection calculation on the original entry. An associative memory is programmed with each of the determined protected entries. In one embodiment, each of the determined protected entries are programmed in two consecutive locations in the associative memory. In one embodiment, a protected lookup value is determined based on an original lookup value. The protected lookup value includes the original lookup value and one or more protection bits determined by the parity or other error protection calculation on the original lookup value. A lookup operation is performed in the associative memory based on the protected lookup value.

In one embodiment, a lookup operation is performed in the associative memory based on a protected lookup word. In one embodiment, the protected lookup word includes a lookup word original data portion and a lookup word protected data portion. The lookup word protected data portion includes multiple bits, each of the multiple bits is determined by a parity or other error protection calculation on a result of the lookup word original data portion masked with a different one of the multiple masks. In one embodiment, there are n multiple masks and the lookup word protected data portion has n bits.

One embodiment determines a protected lookup word based on a lookup word. The lookup word includes a lookup word original data portion. The protected lookup word includes the lookup word original data portion and multiple error protection bits. Each of the multiple protection bits corresponds to one of multiple masks and is determined by a parity or other error protection calculation on a result of the original data portion masked with a different one of the multiple masks. A lookup operation is performed in the associative memory based on the protected data word.

One embodiment includes a protected lookup word generator and an associative memory. The protected lookup word generator for determining a protected lookup word, the protected lookup word generator is configured to receive a lookup word. The lookup word includes a lookup word original data portion. The protected lookup word includes the lookup word original data portion and multiple error protection bits, with each of the multiple protection bits corresponding to one of multiple masks and is determined by a parity or other error protection calculation on a result of the original data portion masked with a different one of the multiple masks. The associative memory is configured to receive the protected lookup word and to generate an associative memory result based on the protected lookup word.

One embodiment includes a protective associative memory entry generator configured to determine a protected entry for each entry in multiple associative memory entries. Each entry includes an original data portion and an original mask portion. The protected entry includes a protected data portion and a protected mask portion. The protected data portion includes the original data portion and a protection bit located at a bit position corresponding to the original mask portion. The protected mask portion includes the original mask portion and a mask to enable the protection bit corresponding to the original mask portion and to mask protection bits corresponding to other masks of the multiple masks. The protection bit is determined by a parity or other error protection calculation on a result of the original data portion masked with the original mask portion. The associative memory is programmed with the determined protected entry for each entry in the multiple associative memory entries.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
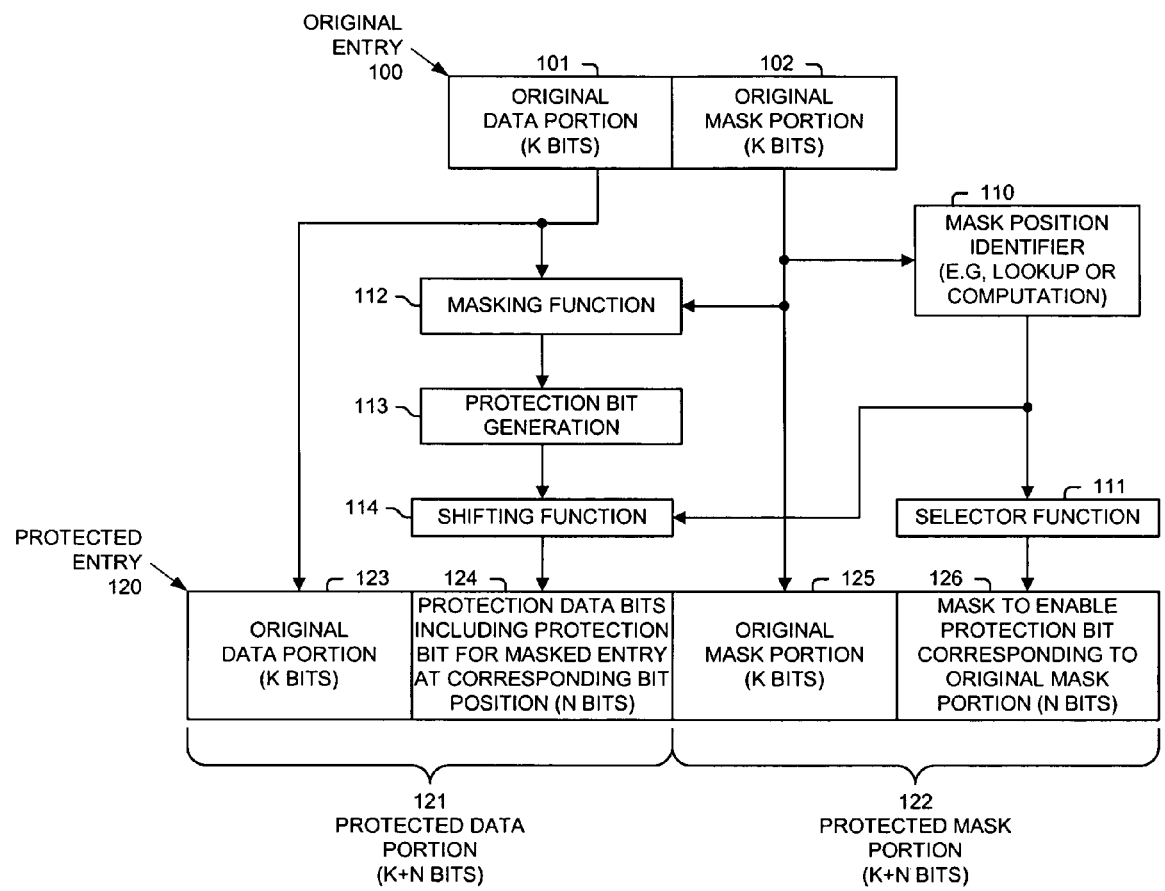
FIG. 1A is a block diagram illustrating the generation of protected entries used in one embodiment.

Disclosed are, inter alia, methods, apparatus, data structures, computer-readable media, mechanisms, and means for providing error protection for associative memory entries and lookup operations performed thereon.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Error protection is provided for associative memory entries and lookup operations performed thereon. Protected associative memory entries are determined which include one or more protection bits. These protected entries are programmed into an associative memory, typically with each protected entry being programmed into two or more consecutive locations. Corresponding protected lookup words are generated and used to perform lookup operations in the associative memory. For binary content-addressable memories (CAMs) and ternary content-addressable memory (TCAMs), one or more error detection bits are used per entry to prevent or at least reduce the possibility of a lookup error. For example, a single parity bit or multiple error-correction code (ECC) bits may be used per entry. The use of the protection bit or bits reduces the possibility of a false matching of a corrupted entry, and the duplicate entries reduce the possibility of not matching an entry that should be matched as all copies of the entry must be corrupt in order to not match one of the entries during a lookup operation. For example, when a TCAM is used for determining IPv4 routes, one router typically uses approximately a dozen different prefixes. In a worst case scenario, one embodiment uses as many error protection bits as there are bits in the mask of an entry.

One embodiment identifies multiple masks used for multiple associative memory entries. A protected entry for each entry in the multiple associative memory entries is determined. Each entry includes an original data portion and an original mask portion.

Each determined protected entry includes a protected data portion and a protected mask portion. The protected data portion includes the original data portion and a protection bit located at a bit position corresponding to the original mask portion. The protected mask portion includes the original mask portion and a mask to enable the protection bit corresponding to the original mask portion and to mask protection bits corresponding to other masks of the multiple masks. The protection bit is determined by a parity or other error protection calculation on a result of the original data portion masked with the original mask portion.

In one embodiment, an associative memory is programmed with each of the protected entries. In one embodiment, each of the protective entries is programmed in two consecutive locations in the associative memory. In one embodiment, a lookup operation based on a protected lookup word is performed in the associative memory. In one embodiment, the protected lookup word includes a lookup word original data portion and a lookup word protected data portion. The lookup word protected data portion typically includes multiple bits, with each of the multiple bits being determined by a parity or other error protection calculation on a result of the lookup word original data portion masked with a different one of the multiple masks. In one embodiment, there are n multiple masks and the lookup word protected data portion has n bits.

One embodiment determines a protected entry for each original entry of multiple original associative memory entries, with the protected entry including the original entry and one or more protection bits. The one or more protection bits are determined by a parity or other error protection calculation on the original entry. An associative memory is programmed with each of the determined protected entries. In one embodiment, each of the determined protected entries are programmed in two consecutive locations in the associative memory. In one embodiment, a protected lookup value is determined based on an original lookup value. The protected lookup value includes the original lookup value and one or more protection bits determined by the parity or other error protection calculation on the original lookup value. A lookup operation is performed in the associative memory based on the protected lookup value.

In one embodiment, a lookup operation is performed in the associative memory based on a protected lookup word. In one embodiment, the protected lookup word includes a lookup word original data portion and a lookup word protected data portion. The lookup word protected data portion includes multiple bits, each of the multiple bits is determined by a parity or other error protection calculation on a result of the lookup word original data portion masked with a different one of the multiple masks. In one embodiment, there are n multiple masks and the lookup word protected data portion has n bits.

One embodiment determines a protected lookup word based on a lookup word. The lookup word includes a lookup word original data portion. The protected lookup word includes the lookup word original data portion and multiple error protection bits. Each of the multiple protection bits corresponds to one of multiple masks and is determined by a parity or other error protection calculation on a result of the original data portion masked with a different one of the multiple masks. A lookup operation is performed in the associative memory based on the protected data word.

One embodiment includes a protected lookup word generator and an associative memory. The protected lookup word generator for determining a protected lookup word, the protected lookup word generator is configured to receive a lookup word. The lookup word includes a lookup word original data portion. The protected lookup word includes the lookup word original data portion and multiple error protection bits, with each of the multiple protection bits corresponding to one of multiple masks and is determined by a parity or other error protection calculation on a result of the original data portion masked with a different one of the multiple masks. The associative memory is configured to receive the protected lookup word and to generate an associative memory result based on the protected lookup word.

One embodiment includes a protective associative memory entry generator configured to determine a protected entry for each entry in multiple associative memory entries. Each entry includes an original data portion and an original mask portion. The protected entry includes a protected data portion and a protected mask portion. The protected data portion includes the original data portion and a protection bit located at a bit position corresponding to the original mask portion. The protected mask portion includes the original mask portion and a mask to enable the protection bit corresponding to the original mask portion and to mask protection bits corresponding to other masks of the multiple masks. The protection bit is determined by a parity or other error protection calculation on a result of the original data portion masked with the original mask portion. The associative memory is programmed with the determined protected entry for each entry in the multiple associative memory entries.

Turning to the figures, FIG. 1A illustrates the generation of protected entries performed in one embodiment. As shown, protected entry 120 includes and/or comprises a protected data portion 121 and a protected mask portion 122. Protected data portion 121 includes and/or comprises original data portion 123 and protection data bits 124. Protected mask portion includes and/or comprises original mask portion 125 and protection mask 126.

Original entry 100 (e.g., a typically TCAM entry including a data portion and mask portion) includes an original data portion 101 and an original mask portion 102. A mask position identifier 110 identifies a bit position corresponding to original mask portion 102. This can be performed in an unlimited different manners, such as, but not limited to a lookup operation in a table, array or content-addressable memory, a calculation, etc. Selector function 111 then enables (set or clears) the bit corresponding to the identified bit position to matter, and causes (clears or sets) all other bit positions in protection mask 126 to be mask enabled bits (i.e., to mask all bits not corresponding to the relevant protection bit). Thus, in one embodiment, N protection data bits and N protection mask bits are used for N different original masks (e.g., corresponding to original mask portion 102). The protected mask portion then includes and/or comprises the original mask portion 125 copied from original mask portion 102 and the protection mask 126.

The original data portion 123 of protected data portion 121 is copied from original data portion 101 of original entry 100. To determine the value of the relevant protection bit, the original data portion 101 is masked with the original mask portion 102 as illustrated by masking function 112, and then the protection bit generation function 113 (e.g., even or odd parity or some other error protection function—i.e., any protection or detection function) produces the protection bit, and is located as illustrated by shifting function 114 in the bit position within protection data bits 124 corresponding to the original mask portion 102 (as determined by mask position identifier 110). Note, in one embodiment, the other bits will be masked by protection mask 126 so they don't matter.

Using protected entry 120 instead of original entry 100 provides a mechanism whereby a single corrupted bit in an entry will cause the entry not to match during a lookup operation, which ensures that there is not a false hit on this corrupted entry.

Figure 1B:
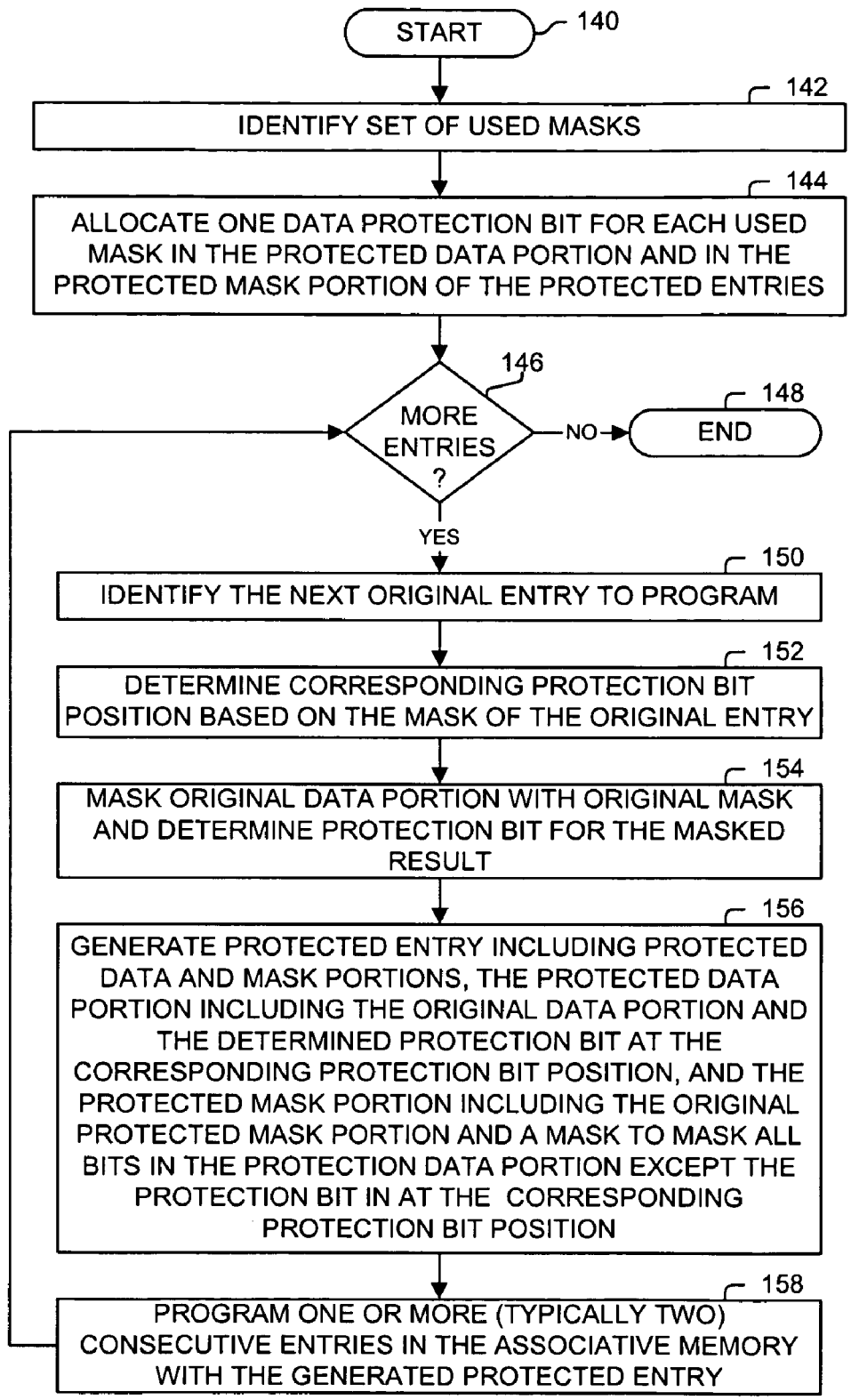
FIG. 1B is a flow diagram illustrating a process used in one embodiment for generating protected entries.
Figure 1C:
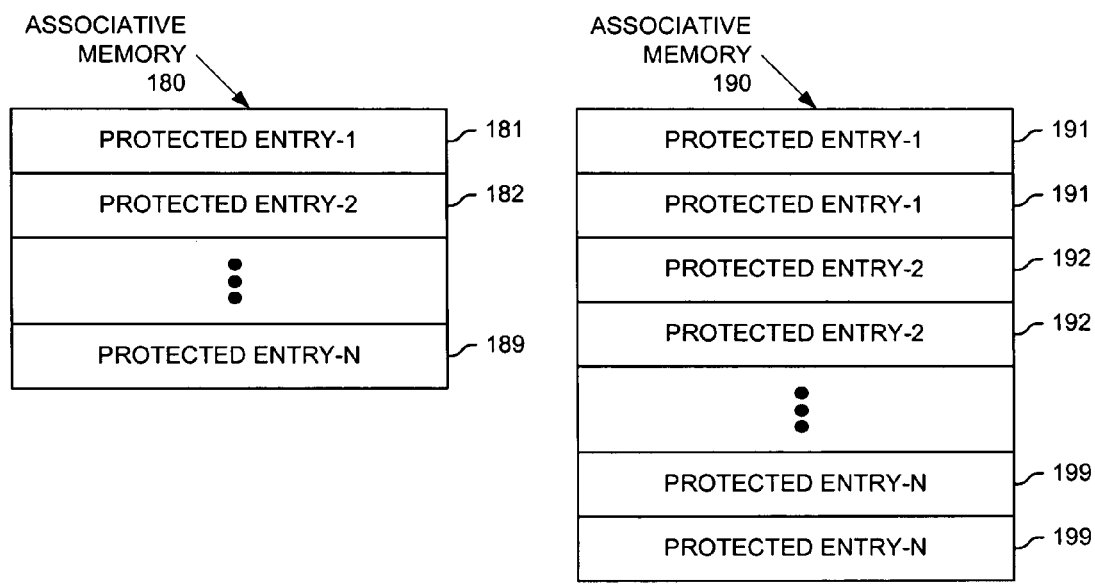
FIG. 1C is a block diagram illustrating exemplary programming of an associative memory with protected entries.

FIG. 1C illustrates exemplary programming of an associative memory with protected entries. In one embodiment, an associative memory 180 is programmed with the generated protected entries 181-189. In one embodiment, an associative memory 190 is programmed with associative memory entries 191-199 with each entry programmed two or more times typically in consecutive locations as this significantly reduces the probability of a false miss (i.e., not correctly matching an uncorrupted entry) as all of these same entries must be corrupted in order not to match one of them. Thus, if the first entry of multiple same entries in the search order is not corrupted it will appropriately match or miss. If the first entry (or more entries) of multiple same entries in the search order is corrupted it will be forced to not match the lookup word. Therefore, one of the other same entries (assuming they are all not corrupted) will generate a hit if it matches the protected lookup word, and thus avoid a false miss condition (as occurred because of the corrupted first entry in this example).

FIG. 1B illustrates a process used in one embodiment for generating protected entries. Processing begins with process block 140, and proceeds to process block 142, wherein the set of used masks is identified. Next, in process block 144, one protection bit for each used mask is allocated in the protection data portion and the protected mask portion of the protected entries.

As determined in process block 146, while there are more original entries to process, the next original entry to program is identified in process block 150. Then, in process block 152, the corresponding protection bit position is determined based on the mask of the original entry (e.g., via a table lookup operation, a calculation, etc.). In process block 154, the original data portion is masked with the original mask portion of the current original entry, and the value of the protection bit is determined based on the masked result. In process block 156, the protected entry including the protected data and mask portions is generated. The protected data portion includes the original data portion and the determined protection bit at the corresponding protection bit position. The protected mask portion includes the original protected mask portion and a mask to mask all bits in the protection data portion except the protection bit in the corresponding protection bit position. Next, in process block 158, one or more consecutive entries (typically two) in the associative memory are programmed with the generated protection entry. In one embodiment, all the protection entries are first generated, and subsequently the protection entries are programmed into the associative memory. Processing of the flow diagram returns to process block 146, to determine if there are more original entries to process. When all original entries have been processed, processing is complete as indicated by process block 148.

Figure 2A:
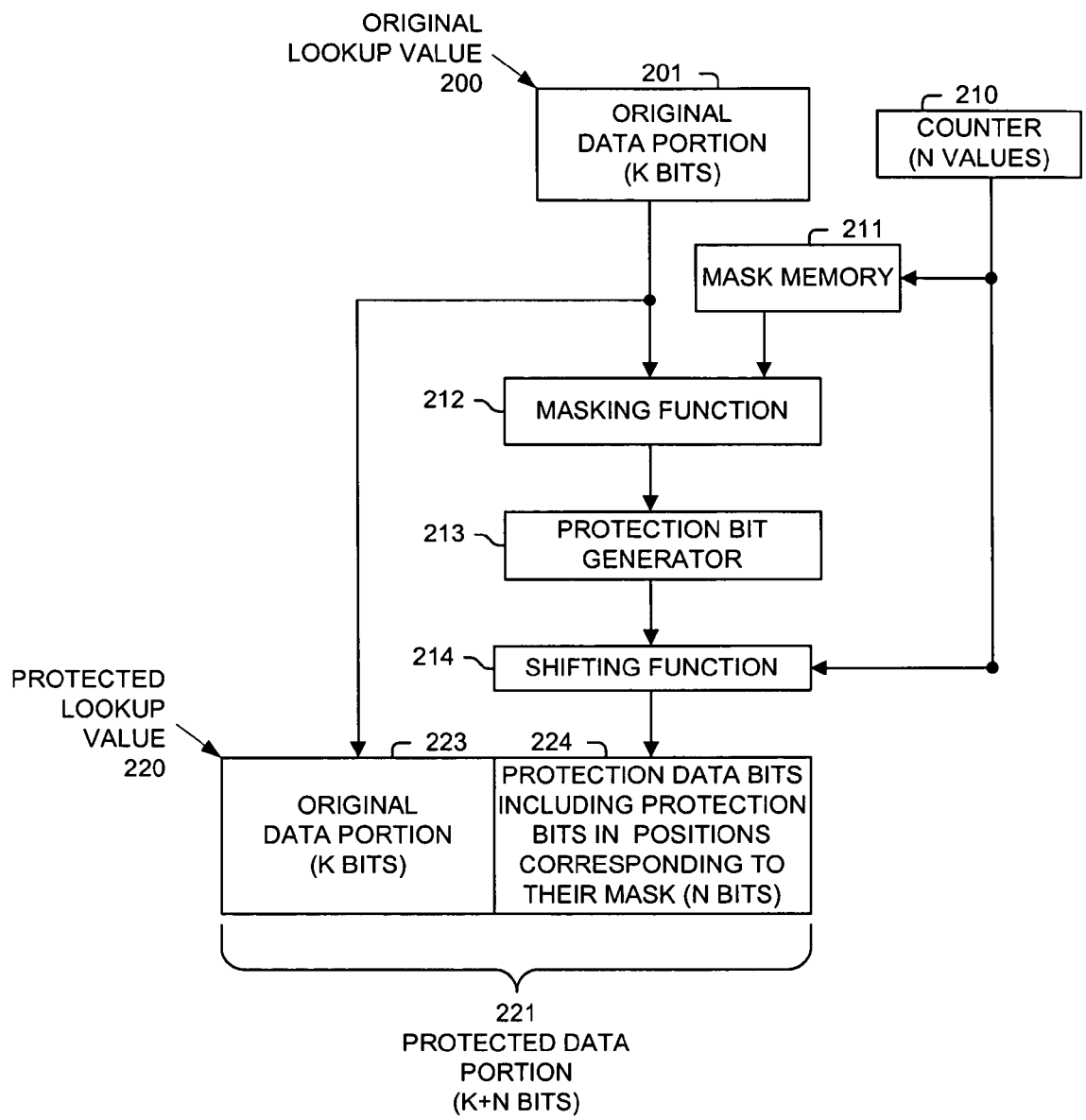
FIG. 2A is a block diagram illustrating the generation of a protected lookup value used in one embodiment.

FIG. 2A is a block diagram illustrating the generation of a protected lookup value used in one embodiment. Original lookup value 200 includes an original data portion 201, which is replicated into original data portion 223 of the generated protected lookup value 220 and protected data portion 221, which also includes an ordered set of protection data bits 224, one for each of the possible masks used to mask an associative memory entry.

One embodiment generates these protection data bits by sequencing through each of the possible masks, determining the corresponding value of the protection bit, and storing it in the proper bit position within field 224.

One embodiment does this by using a counter 210 to sequence through the possible masks stored in mask memory 211. A masking function 212 then masks the original lookup values 200 with the mask. Protection bit generator 213 determines the value of the protection bit to used, and shifting function 214 based on counter 210 positions the generated protection bit into the proper bit position within field 224.

Figure 2B:
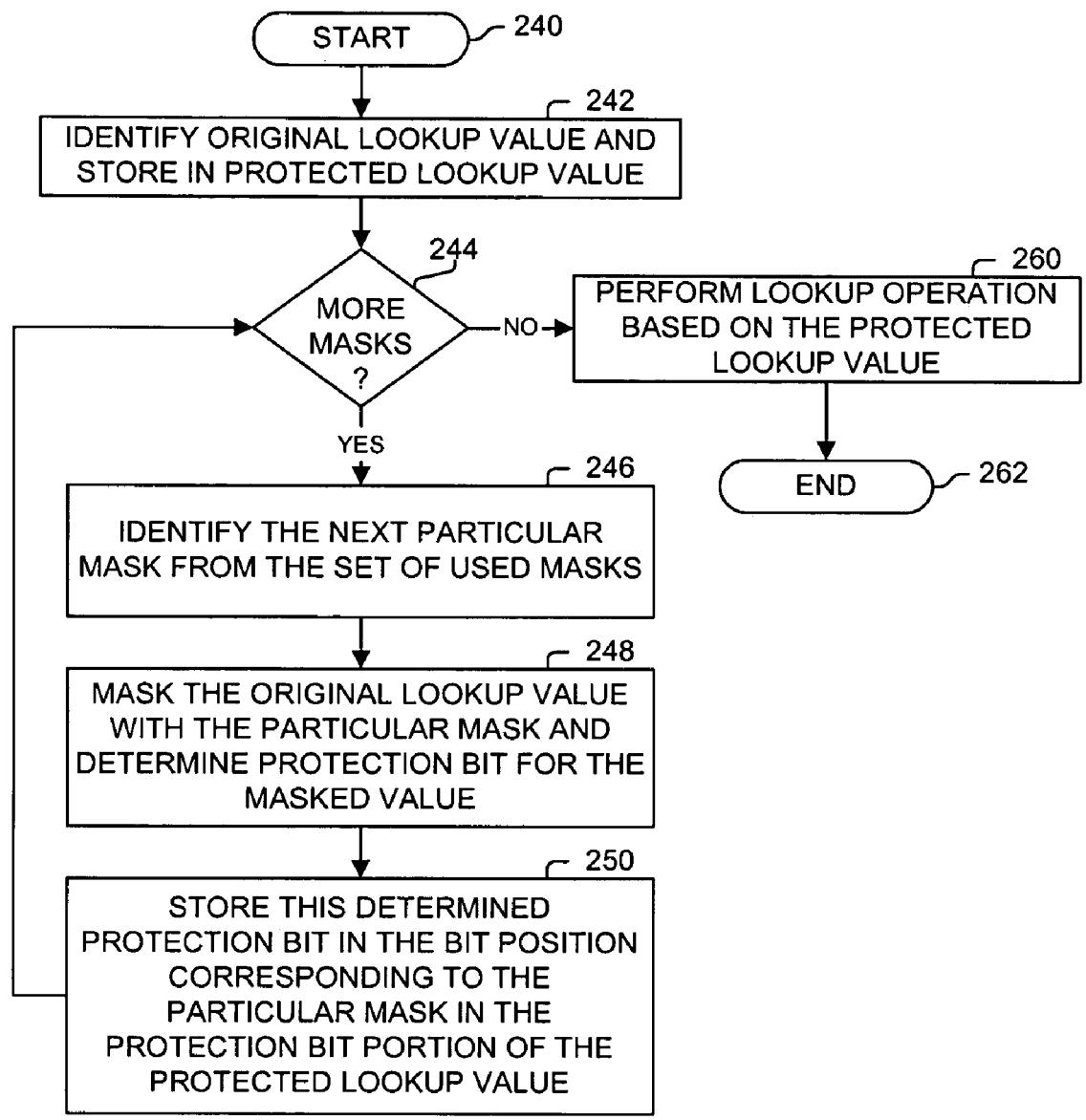
FIG. 2B is a flow diagram illustrating a process used in one embodiment for generating protected lookup values.

FIG. 2B is a flow diagram illustrating a process used in one embodiment for generating protected lookup values. Processing begins with process block 240, and proceeds to process block 242, wherein an original lookup value is identified and replicated in the protected lookup value. While there are more possible masks as determined in process block 244, a next particular one of the masks is identified in process block 246. In process block 248, the original lookup values is masked with the particular mask, with the value of the protection bit being determined based on the mask result. In process block 250, the determined protection bit is stored in the corresponding position in the protected bit portion of the protected lookup value being generated.

After all protection bits have been generated and added to the original lookup value to generate the protected lookup value as determined in process block 244, the lookup operation is performed in process block 260 on the set of protected lookup entries. Processing is complete as indicated by process block 262.

Note, one embodiment uses a set of multiple protection bits per mask in place of the single bit described in relation to FIGS. 1A-B and 2A-B, as the increased number of protection bits provides enhanced error detection, but at a cost of more bits per entry.

FIGS. 3A, 3B, 4A and 4C illustrate the generation of protected associative memory entries and lookup values when each entry is not masked, such as those entries typically used in a binary content-addressable memory.

Figure 3A:
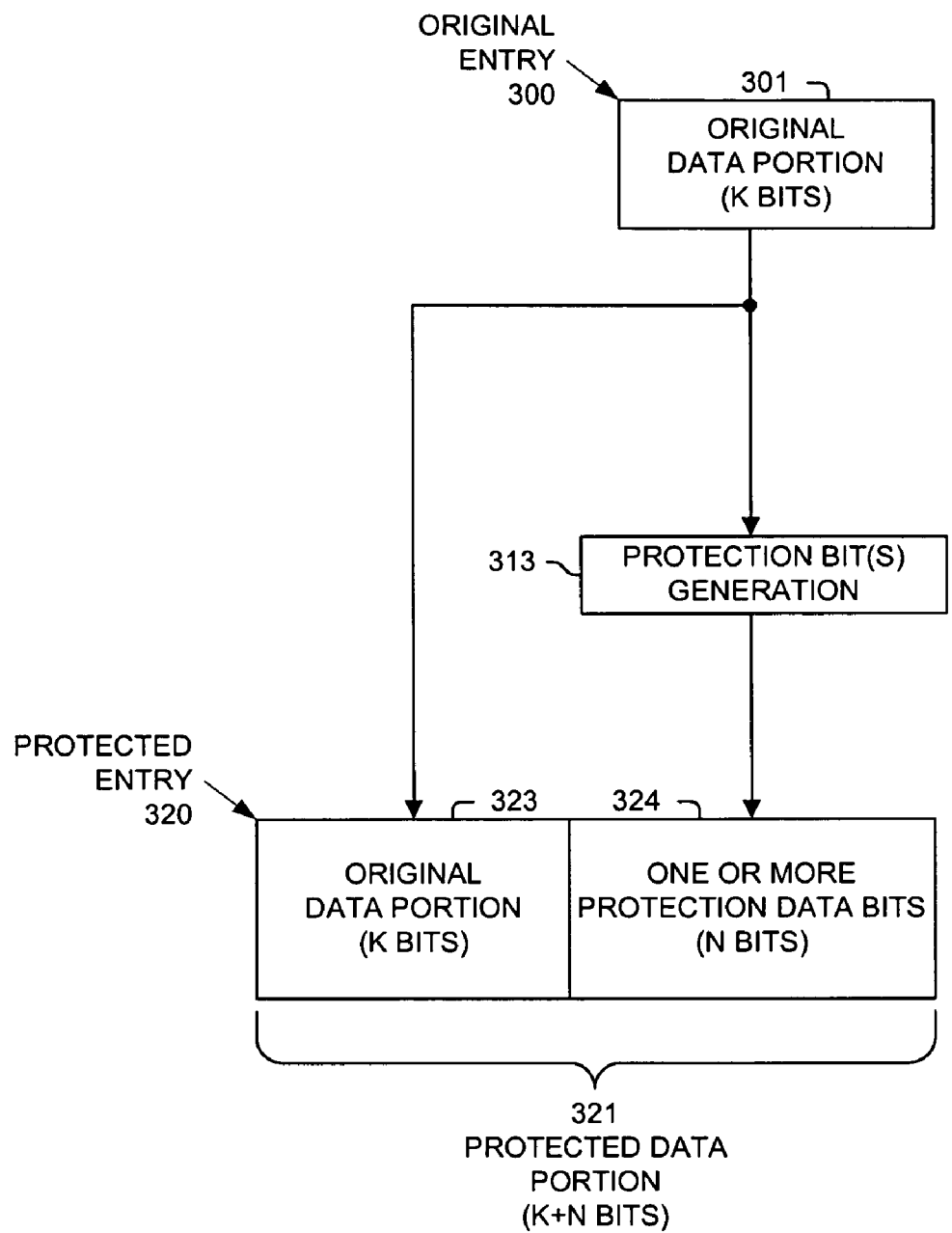
FIG. 3A is a block diagram illustrating the generation of protected entries used in one embodiment.

FIG. 3A illustrates the generation of protected entries used in one embodiment. Original entry 300 includes an original data portion 301, which is replicated in original data portion 323 of protected entry 320. One or more protection bits (e.g., even or odd parity or some other error protection function—i.e., any protection or detection function) are determined by protection bit(s) generation function 313 and placed in field 324. Protected entry 320 and protected data portion 321 thus includes and/or consists of original data portion 323 and one or more protection data bits 324.

Figure 3B:
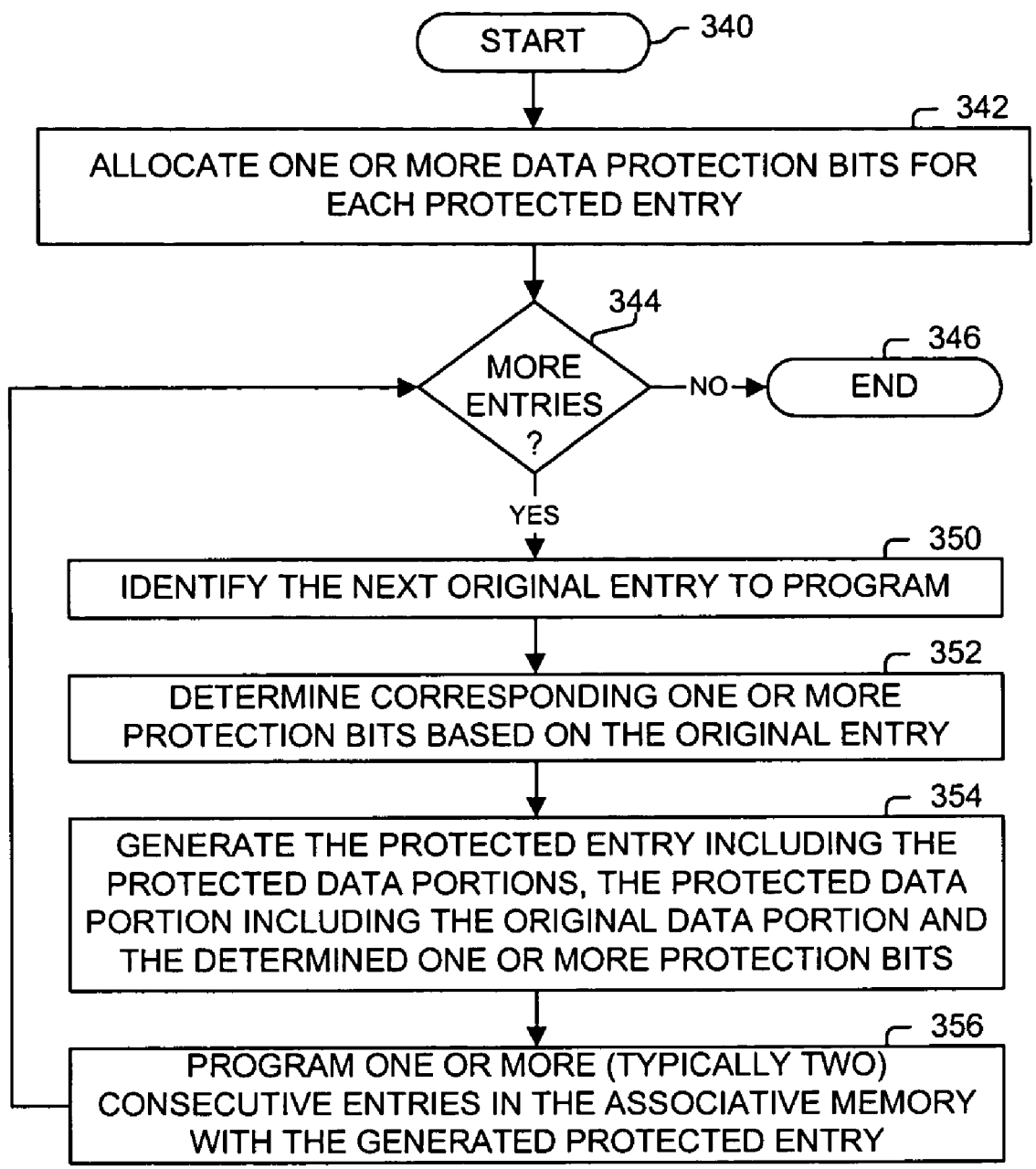
FIG. 3B is a flow diagram illustrating a process used in one embodiment for generating protected entries.

FIG. 3B illustrates a process used in one embodiment for generating protected entries. Processing begins with process block 340, and proceeds to process block 342, wherein one or more data protection bits are allocated in each protected entry. While there are more original entries to process as determined in process block 344, the next original entry is identified in process block 350. In process block 352, the corresponding one or more protection bits are determined based on the original entry. In process block 354, the protected entry is generated including the protected data portions, the protected data portions including the original data portion and the determined one or more protection bits. Next, in process block 356, one or more consecutive entries (typically two) in the associative memory are programmed with the generated protection entry. (In one embodiment, all the protection entries are first generated, and subsequently the protection entries are programmed into the associative memory.) Processing of the flow diagram returns to process block 344, to determine if there are more original entries to process. When all original entries have been processed, processing is complete as indicated by process block 346.

Figure 4A:
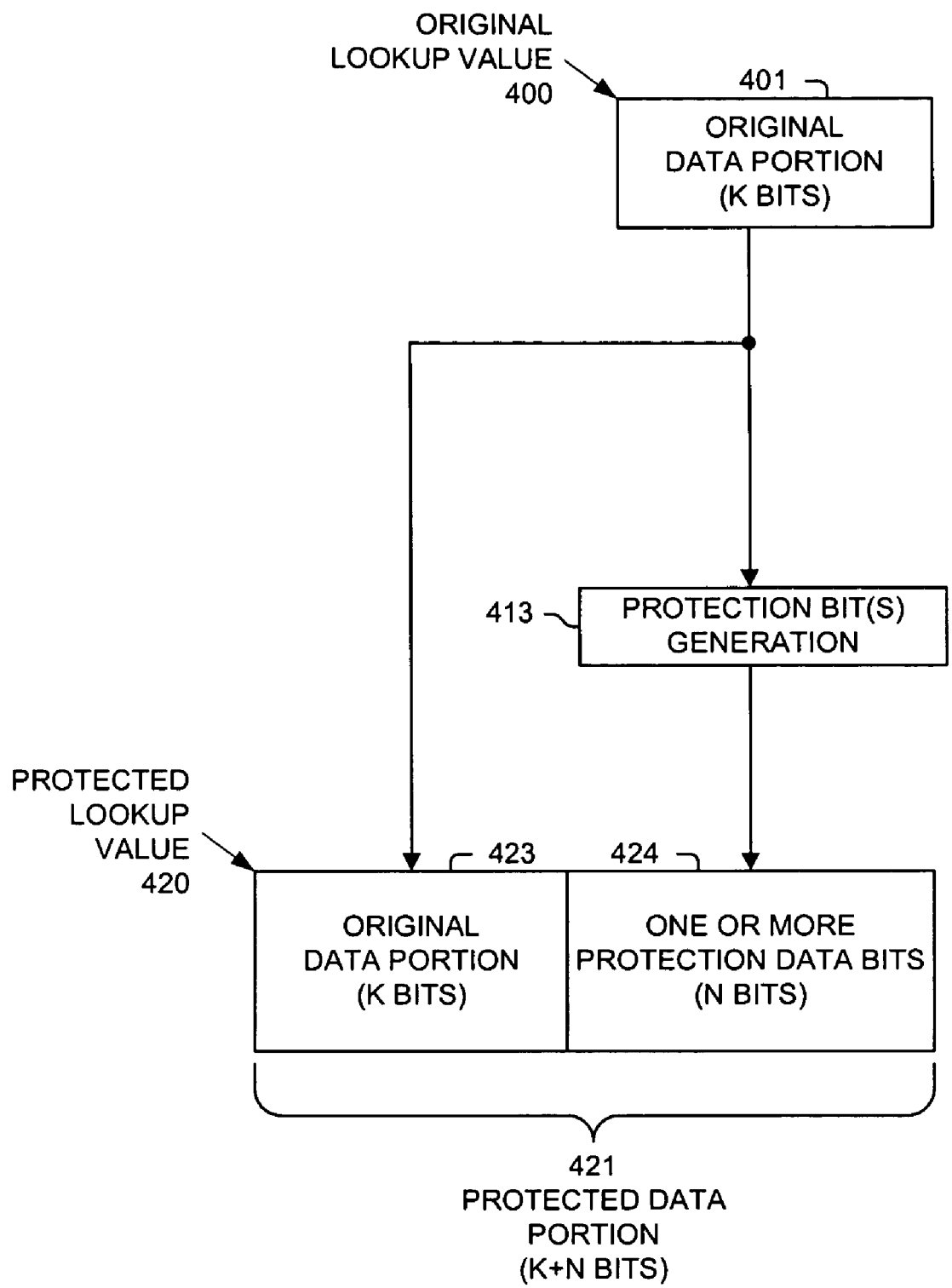
FIG. 4A is a block diagram illustrating the generation of a protected lookup value used in one embodiment.

FIG. 4A illustrates the generation of a protected lookup value used in one embodiment. An original lookup value 400 is identified. Original lookup value includes the original data portion 401, which is replicated in original data portion 423 of protected lookup value 420. One or more protection data bits are determined by protection bit(s) generator 413, and placed in one or more protection data bits 424 of the generated protected lookup value 420. Protected lookup value 420 and protected data portion 421 thus includes and/or consists of original data portion 423 and one or more protection data bits 424.

Figure 4B:
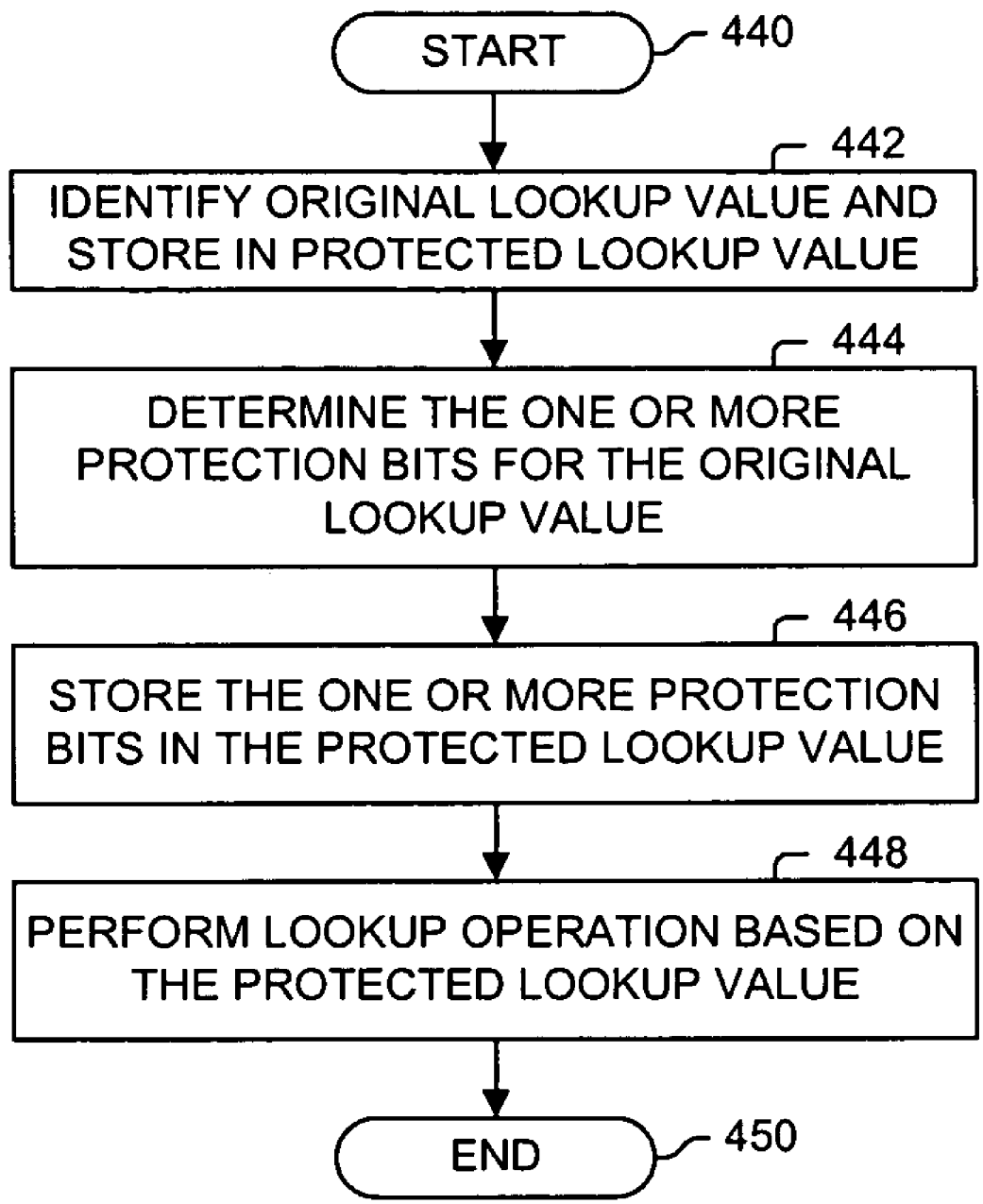
FIG. 4B is a flow diagram illustrating a process used in one embodiment for generating protected lookup values.

FIG. 4B illustrates a process used in one embodiment for generating protected lookup values. Processing begins with process block 440, and proceeds to process block 442, wherein the original lookup value is identified and stored in the protected lookup value being generated. In process block 444, the one or more protection bits are determined for the original lookup value. In process block 446, the one or more protection bits are stored in the generated protected lookup value. In process block 448, a lookup operation is performed on the protected entries based on the protected lookup value. Processing is complete as indicated by process block 450.

Figure 5A:
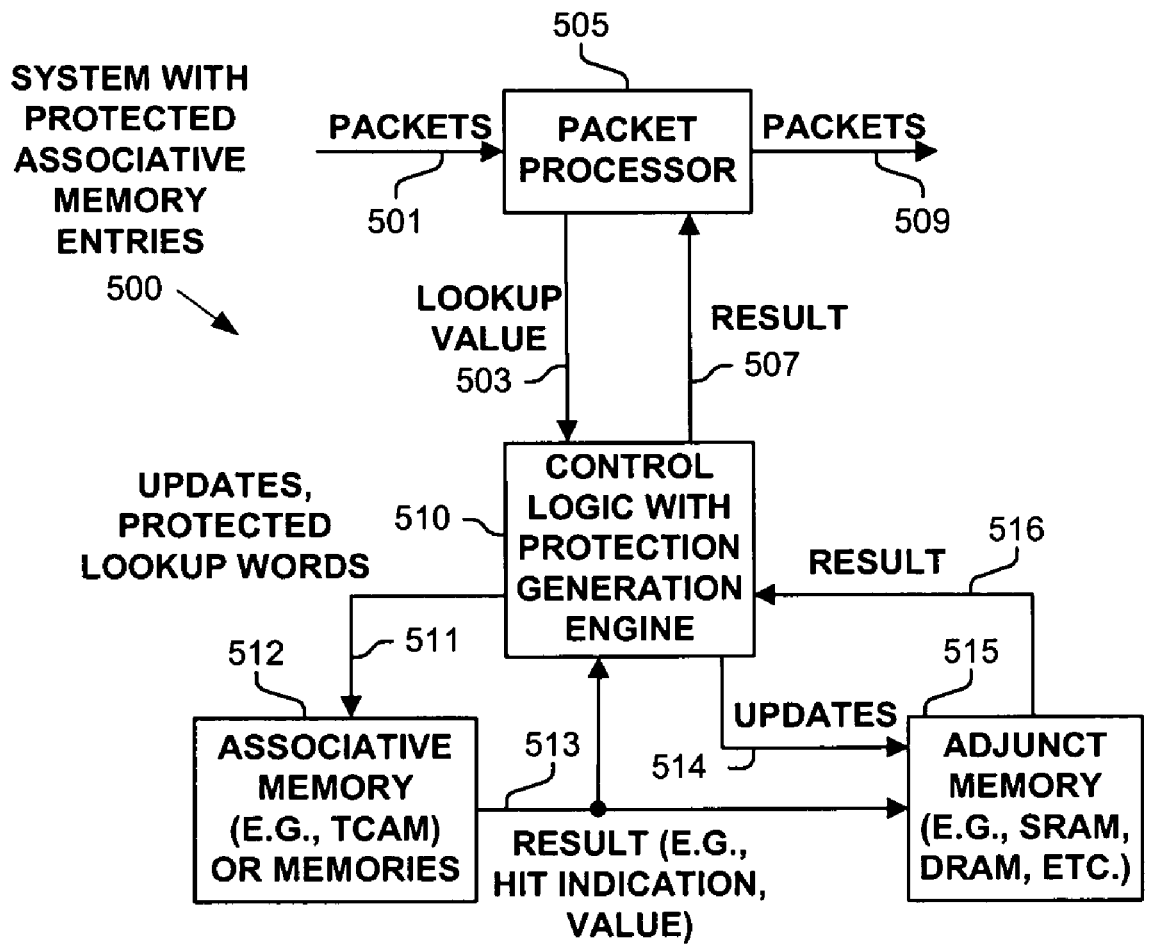
FIG. 5A is a block diagram illustrating an embodiment for generating and programming an associative memory with protected entries and performing lookup operations thereon using generated protected lookup values.

FIG. 5A is a block diagram illustrating a system with protected associative memory entries 500, which generates and programs an associative memory with protected entries and performs lookup operations thereon using the generated protected lookup values. System 500 may be part of a router, communications, computer or any other system or component.

In one embodiment, control logic 510 generates protected entries, programs, updates, generates protected lookup values and performs lookup operations on associative memory or memories 512 by providing updates and protected lookup words 511. In one embodiment, control logic 510 includes custom circuitry, such as, but not limited to discrete circuitry, ASICs, memory devices, processors, etc. Control logic 510 also typically stores indications of desired actions to be taken via updates 514 in adjunct memory or memories 515. A hit result 513 is typically provided to control logic 510 and to adjunct memory or memories 515, which produces result 516. In one embodiment, a single chip or ASIC contains system 500. In one embodiment, a single chip or ASIC contains system 500 except for packet processor 505. In one embodiment, less than all or even no two components of system 500 reside on the same chip or ASIC.

In one embodiment, packets 501 are received by packet processor 505. In addition to other operations (e.g., packet routing, security, etc.), packet processor 505 typically generates a lookup value 503 (either an original or protected lookup value) which is provided to control logic 510, which generates the protected lookup value 511 if required, and initiates one or more associative memory lookup operations on associative memory or memories 512. A result 507 (e.g., a packet classification identification or action) is typically returned to packet processor 505, and in response, one or more of the received packets are manipulated and forwarded as indicated by packets 509.

Figure 5B:
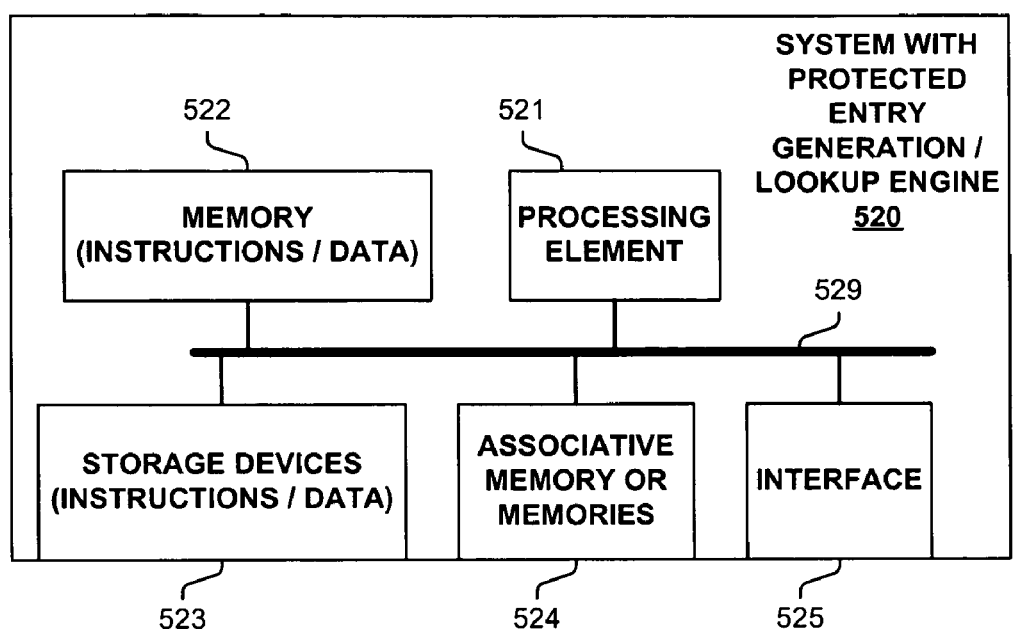
FIG. 5B is a block illustrating a system or component used in one embodiment for generating and/or programming an associative memory with protected entries and/or performing lookup operations thereon using generated protected lookup values.

FIG. 5B is a block illustrating a system or component used in one embodiment for generating and/or programming an associative memory with protected entries and/or performing lookup operations thereon using generated protected lookup values. System 520 may be part of a router, communications, computer or any other system or component. In one embodiment, system 520 performs one or more processes corresponding to one of the diagrams illustrated herein or otherwise described herein.

In one embodiment, system 520 includes a processing element 521, memory 522, storage devices 523, one or more block mask associative memories 524, and an interface 525 for connecting to other devices, which are coupled via one or more communications mechanisms 529 (shown as a bus for illustrative purposes).

Various embodiments of system 520 may include more or less elements. The operation of system 520 is typically controlled by processing element 521 using memory 522 and storage devices 523 to perform one or more tasks or processes, such as programming and performing protected lookup operations using associative memory or memories 524. Memory 522 is one type of computer readable media, and typically comprises random access memory (RAM), read only memory (ROM), flash memory, integrated circuits, and/or other memory components. Memory 522 typically stores computer executable instructions to be executed by processing element 521 and/or data which is manipulated by processing element 521 for implementing functionality in accordance with one embodiment of the invention. Storage devices 523 are another type of computer readable media, and typically comprise solid state storage media, disk drives, diskettes, networked services, tape drives, and other storage devices. Storage devices 523 typically store computer executable instructions to be executed by processing element 521 and/or data which is manipulated by processing element 521 for implementing functionality in accordance with one embodiment of the invention.

In one embodiment, processing element 521 provides control and data information (e.g., lookup words, modification data, profile IDs, etc.) to associative memory or memories 524, which perform lookup operations to generate lookup results and possibly error indications, which are received and used by processing element 521 and/or communicated to other devices via interface 525.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for protecting associative memory entries, the method comprising:

identifying a plurality of masks used for a plurality of associative memory entries; and determining a protected entry for each entry in the plurality of associative memory entries, said each entry including an original data portion and an original mask portion, the protected entry including a protected data portion and a protected mask portion, the protected data portion including the original data portion and a protection bit located at a bit position corresponding to the original mask portion, and the protected mask portion including the original mask portion and a mask to enable the protection bit corresponding to the original mask portion and to mask protection bits corresponding to other masks of the plurality of masks;

wherein the protection bit is determined by a parity or other error protection calculation on a result of the original data portion masked with the original mask portion.

2. The method of claim 1, comprising programming an associative memory with each of said protected entries.

3. The method of claim 2, wherein said programming the associative memory with each of said protected entries includes programming each of said protective entries in two consecutive locations in the associative memory.

4. The method of claim 3, comprising performing a lookup operation in the associative memory based on a protected lookup word.

5. The method of claim 4, wherein the protected lookup word includes a lookup word original data portion and a lookup word protected data portion, the lookup word protected data portion including a plurality of bits, each of the plurality of bits being determined by a parity or other error protection calculation on a result of the lookup word original data portion masked with a different one of the plurality of masks.

6. The method of claim 5, wherein the plurality of masks consists of n masks and the lookup word protected data portion consists of n bits.

7. The method of claim 2, comprising performing a lookup operation in the associative memory based on a protected lookup word.

8. The method of claim 7, wherein the protected lookup word includes a lookup word original data portion and a lookup word protected data portion, the lookup word protected data portion including a plurality of bits, each of the plurality of bits being determined by a parity or other error protection calculation on a result of the lookup word original data portion masked with a different one of the plurality of masks.

9. The method of claim 8, wherein the plurality of masks consists of n masks and the lookup word protected data portion consists of n bits.

10. The method of claim 1, wherein the plurality of masks consists of n masks and the mask in the protected mask portion consists of n bits.

11. A method for protecting associative memory entries, the method comprising:

determining a protected entry for each original entry of a plurality of original associative memory entries, the protected entry including the original entry and one or more protection bits, wherein said one or more protection bits are determined by a parity or other error protection calculation on the original entry; and programming an associative memory with said each determined protected entry such that each particular entry of said determined protected entries is completely replicated in two or more consecutive entries in the associative memory.

12. The method of claim 11, comprising:

determining a protected lookup value based on an original lookup value, the protected lookup value including the original lookup value and one or more protection bits determined by said parity or other error protection calculation on the original lookup value; and performing a lookup operation in the associative memory based on the protected lookup value.

13. An apparatus for protecting associative memory entries, the apparatus comprising:

means for determining a protected entry for each original
entry of a plurality of original associative memory
entries, the protected entry including the original entry
and one or more protection bits, wherein said one or
more protection bits are determined by a parity or other
error protection calculation on the original entry; and means for programming an associative memory with said
each determined protected entry such that each particular entry of said determined protected entries is completely replicated in two or more consecutive entries in
the associative memory.

14. The apparatus of claim 13, comprising:

means for determining a protected lookup value based on
an original lookup value, the protected lookup value
including the original lookup value and one or more
protection bits determined by said parity or other error
protection calculation on the original lookup value; and means for performing a lookup operation in the associative memory based on the protected lookup value.

15. A method for performing lookup operations on an associative memory, the method comprising:

determining a protected lookup word based on a lookup
word, the lookup word including a lookup word original data portion, the protected lookup word including
the lookup word original data portion and a plurality of
error protection bits, each of the plurality of protection
bits corresponding to one of a plurality of masks and
being determined by a parity or other error protection
calculation on a result of the original data portion
masked with a different one of the plurality of masks;
and performing a lookup operation in the associative memory
based on the protected data word.

16. An apparatus for performing lookup operations on an associative memory, the apparatus comprising:

means for determining a protected lookup word based on
a lookup word, the lookup word including a lookup
word original data portion, the protected lookup word
including the lookup word original data portion and a
plurality of error protection bits, each of the plurality of
protection bits corresponding to one of a plurality of
masks and being determined by a parity or other error
protection calculation on a result of the original data
portion masked with a different one of the plurality of
masks; and means for performing a lookup operation in the associative memory based on the protected data word.

17. An apparatus for performing lookup operations, the apparatus comprising:

a protected lookup word generator for determining a
protected lookup word, the protected lookup word
generator configured to receive a lookup word, the
lookup word including a lookup word original data
portion, the protected lookup word including the
lookup word original data portion and a plurality of
error protection bits, each of the plurality of protection
bits corresponding to one of a plurality of masks and
being determined by a parity or other error protection
calculation on a result of the original data portion
masked with a different one of the plurality of masks;
and an associative memory configured to receive the protected
lookup word and to generate an associative memory
result based on the protected lookup word.

18. The apparatus of claim 17, comprising a protective associative memory entry generator configured to determine a protected entry for each entry in a plurality of associative memory entries, said each entry including an original data portion and an original mask portion, the protected entry including a protected data portion and a protected mask portion, the protected data portion including the original data portion and a protection bit located at a bit position corresponding to the original mask portion, and the protected mask portion including the original mask portion and a mask to enable the protection bit corresponding to the original mask portion and to mask protection bits corresponding to other masks of the plurality of masks; wherein the protection bit is determined by a parity or other error protection calculation on a result of the original data portion masked with the original mask portion;

wherein the associative memory is programmed with said
determined protected entry for each entry in the plurality of associative memory entries.

19. An apparatus for protecting associative memory entries, the apparatus comprising:

means for identifying a plurality of masks used for a
plurality of associative memory entries;

means for determining a protected entry for each entry in
the plurality of associative memory entries, said each
entry including an original data portion and an original
mask portion, the protected entry including a protected
data portion and a protected mask portion, the protected
data portion including the original data portion and a
protection bit located at a bit position corresponding to
the original mask portion, and the protected mask
portion including the original mask portion and a mask
to enable the protection bit corresponding to the original mask portion and to mask protection bits corresponding to other masks of the plurality of masks;

wherein the protection bit is determined by a parity or
other error protection calculation on a result of the
original data portion masked with the original mask
portion.

20. The apparatus of claim 19, comprising:

means for programming an associative memory with each
of said protected: entries; and means for performing a lookup operation in the associative memory based on a protected lookup word;

wherein the protected lookup word includes a lookup
word original data portion and a lookup word protected
data portion, the lookup word protected data portion
including a plurality of bits, each of the plurality of bits
being determined by a parity or other error protection
calculation on a result of the lookup word original data
portion masked with a different one of the plurality of
masks.

21. The apparatus of claim 20, wherein said means for programming the associative memory with each of said protected entries includes means for programming each of said protective entries in two consecutive locations in the associative memory.

* * * * *